(12) United States Patent
Son et al.

(10) Patent No.: US 11,379,882 B2
(45) Date of Patent: *Jul. 5, 2022

(54) ALLOCATING RESOURCES ACCORDING TO CONVERSION RATE

(71) Applicant: Snap Inc., Santa Monica, CA (US)

(72) Inventors: Aaron Son, Los Angeles, CA (US); Brian Hendriks, Pacific Palisades, CA (US)

(73) Assignee: Snap Inc., Santa Monica, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 16/850,271

(22) Filed: Apr. 16, 2020

(65) Prior Publication Data

US 2020/0242668 A1 Jul. 30, 2020

Related U.S. Application Data

(63) Continuation of application No. 14/860,774, filed on Sep. 22, 2015, now Pat. No. 10,664,873.

(51) Int. Cl.
*G06Q 30/02* (2012.01)
(52) U.S. Cl.
CPC .............................. *G06Q 30/0275* (2013.01)
(58) Field of Classification Search
CPC .................................................. G06Q 30/0275
See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,533,044 B2 | 9/2013 | Oren et al. | |
| 8,718,333 B2 | 5/2014 | Wolf et al. | |
| 8,724,622 B2 | 5/2014 | Rojas | |

(Continued)

FOREIGN PATENT DOCUMENTS

CA 2887596 A1 7/2015

OTHER PUBLICATIONS

Online Advertisement Campaign Optimization, Weiguo Liu, IEEE (Year: 2007).*

(Continued)

*Primary Examiner* — Abhishek Vyas
*Assistant Examiner* — Darnell A Pouncil
(74) *Attorney, Agent, or Firm* — Schwegman Lundberg & Woessner, P.A.

(57) ABSTRACT

A system and method for selecting advertisements is disclosed. In example embodiments, a method includes submitting an offer to display an advertisement at a remote device, receiving one or more advertising bids, each bid indicating an advertisement and comprising bid amount, selecting a bid from the one or more advertising bids that results in a highest product, the highest product calculated by multiplying an estimated conversion rate for the advertisement indicated by the bid with the bid amount of the bid, and transmitting the advertisement indicated by the bid to the remote device for display.

20 Claims, 12 Drawing Sheets

(56) References Cited

U.S. PATENT DOCUMENTS

| | | | |
|---|---|---|---|
| 8,768,766 | B2 | 7/2014 | Ellis et al. |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,489,661 | B2 | 11/2016 | Evans et al. |
| 9,491,134 | B2 | 11/2016 | Rosen et al. |
| 2007/0088851 | A1 | 4/2007 | Levkovitz et al. |
| 2008/0004954 | A1 | 1/2008 | Horvitz |
| 2008/0103898 | A1 | 5/2008 | Flake et al. |
| 2009/0136011 | A1 | 5/2009 | Goel |
| 2011/0040636 | A1 | 2/2011 | Simmons et al. |
| 2011/0202598 | A1 | 8/2011 | Evans et al. |
| 2012/0059713 | A1 | 3/2012 | Galas et al. |
| 2012/0158875 | A1 | 6/2012 | Almeida |
| 2012/0209924 | A1 | 8/2012 | Evans et al. |
| 2013/0006730 | A1 | 1/2013 | Secretan et al. |
| 2013/0144728 | A1 | 6/2013 | Ruarte et al. |
| 2014/0236738 | A1 | 8/2014 | Subramanian et al. |
| 2014/0278981 | A1 | 9/2014 | Mersov et al. |
| 2017/0061502 | A1 | 3/2017 | Zhang et al. |
| 2018/0082159 | A1* | 3/2018 | Torii .................. G06K 15/1836 |

OTHER PUBLICATIONS

"U.S. Appl. No. 14/860,774, Examiner Interview Summary dated Nov. 2, 2018", 3 pgs.

"U.S. Appl. No. 14/860,774, Final Office Action dated May 2, 2019".

"U.S. Appl. No. 14/860,774, Non Final Office Action dated Sep. 20, 2018", 15 pgs.

"U.S. Appl. No. 14/860,774, Notice of Allowance dated Jan. 22, 2020", 8 pgs.

"U.S. Appl. No. 14/860,774, Response filed Jun. 17, 2019 to Final Office Action dated May 2, 2019", 12 pgs.

"U.S. Appl. No. 14/860,774, Response filed Dec. 20, 2018 to Non Final Office Action dated Sep. 20, 2018", 16 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Macvittie, Lori, "Application Delivery Optimization", F5 Networks, Inc., (2015), 17 pgs.

* cited by examiner

ALLOCATING RESOURCES ACCORDING TO CONVERSION RATE

CLAIM OF PRIORITY

This application is a continuation of U.S. patent application Ser. No. 14/860,774, filed on Sep. 22, 2015, which is incorporated herein by reference in its entirety.

TECHNICAL FIELD

Embodiments of the present disclosure generally relate to resource allocation and, more particularly, but not by way of limitation, to allocating resources according to a conversion rate.

BACKGROUND

Advertising in a digital world includes transmission of all kinds of advertising media to remote locations and to devices of varying technical capabilities. Selecting advertisements to be transmitted to such a wide variety of devices at various locations can be difficult.

BRIEF DESCRIPTION OF THE DRAWINGS

Various ones of the appended drawings merely illustrate example embodiments of the present disclosure and should not be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products for selecting advertisements. One system, as described herein, is configured to offer an advertising space to many different advertisement services. In response, the system receives advertisement bids that indicate an advertisement and include a bid amount to be paid for displaying the advertisement.

The system, in one example embodiment, considers many different factors to determine which advertisement to display. Factors include, but are not limited to, network topology, network location of the advertisement as compared with the device receiving the advertisement (ad), network distance, network performance metrics between an ad and a display device, average click speed of a user (e.g., how long the user is likely to remain on a current web page), advertisement size, whether at least a portion of the advertisement can be generated using graphical elements local to the display device, or the like. In one example embodiment, the system applies a multivariable optimization problem using each of the factors to determine weights for the factors, or which factors to consider in an advertising selection decision.

As will be further described, selecting advertisements based on bid amounts may not yield good results because, in many scenarios, the ads that pay the most will not likely be successfully transmitted to the user such that the user views the advertisement.

In another example embodiment, the system determines a conversion rate for an advertisement based on any of the aforementioned factors. The conversion rate indicates an estimated likelihood that the user will successfully view the advertisement. In one example, a user's device is communicating via a wireless network having reduced performance metrics as compared with a wired network. In response, the system will more likely select smaller advertisements because a conversion rate for larger advertisements on a mobile or wireless network is less than a conversion rate for smaller sized advertisements.

In another example, the system selects an advertisement that is physically or virtually closer to a user's device requesting the advertisement because a conversion rate for ads that may be more quickly transmitted is higher than a conversion rate for ads that will take longer amounts of time to transmit (due to increased distance).

In one example, a social messaging application (e.g., SNAPCHAT®) executing on user's mobile computer device requests an advertisement to be displayed and the system determines which advertisement to display in the available spot.

Figure 1:
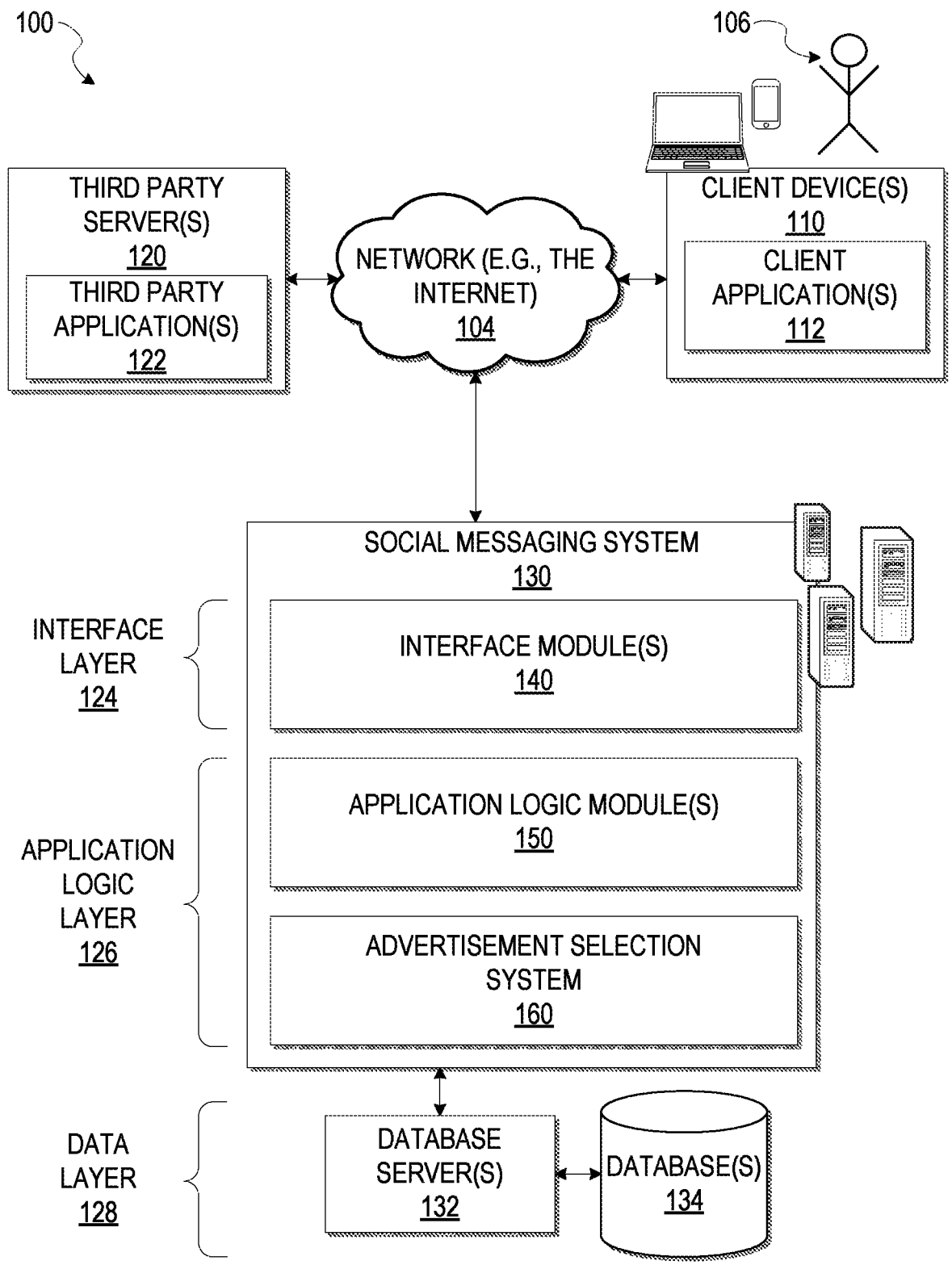
FIG. 1 is a block diagram illustrating a networked system, according to some example embodiments.

FIG. 1 is a block diagram illustrating a networked system 100 having a client-server architecture configured for exchanging data over a network, according to one embodiment. For example, the network system 100 may be a messaging system where clients may communicate and exchange data within the network system 100. The data may pertain to various functions (e.g., sending and receiving text and media communication, determining geolocation, etc.) and aspects associated with the network system 100 and its users. Although embodiments illustrated herein use a client-server architecture, other embodiments may include other network architectures, such as peer-to-peer or distributed network environments.

As shown in FIG. 1, the network system 100 may include a social messaging system 130. The social messaging system 130 is generally based on a three-tiered architecture, consisting of an interface layer 124, an application logic layer 126, and a data layer 128. Each module or engine shown in FIG. 1 represents a set of executable software instructions and the corresponding hardware (e.g., memory and processor) for executing the instructions. Additional functional modules and engines may be used with a social messaging system 130, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such architecture.

As shown in FIG. 1, the interface layer 124 consists of interface module(s) (e.g., a web server) 140, which receives requests from various client-computing devices and servers, such as client device(s) 110 executing client application(s) 112, and third party server(s) 120 executing third party application(s) 122. In response to received requests, the interface module(s) 140 communicates appropriate responses to requesting devices via a network 104. For example, the interface module(s) 140 can receive requests such as Hypertext Transfer Protocol (HTTP) requests, or other web-based, application programming interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. One or more user(s) 106 can be a person, a machine, or other means of interacting with the client device(s) 110. In some embodiments, the user(s) 106 interact with the social messaging system 130 via the client device(s) 110. The user(s) 106 may not be part of the networked environment, but may be associated with the client device(s) 110.

As shown in FIG. 1, the data layer 128 has one or more database server(s) 132 that facilitate access to one or more information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users 106 of the client device(s) 110 to send and receive messages that include text and media content such as images (including pictures and/or video). The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Another aspect of the social messaging application includes an ephemeral gallery of media created by users the social messaging application, in one example embodiment, the galleries consist of videos or pictures posted by a user and made viewable by contacts (e.g., "friends") of the user. Alternatively, public galleries may be created by administrators of the social messaging application consisting of media from any users of the application. In another example embodiment, the public galleries are accessible by all users of the social messaging system 113. In yet another embodiment, the social messaging application includes a "magazine" feature which consists of articles and other content generated by publishers on the social messaging application's platform and accessible by other users of the social messaging system 113. Any of these environments or platforms may be used to implement concepts of the present invention, including, allocating advertising resources according to a conversion rate using techniques described below. Of course, other applications and services may be separately embodied in their own application server module(s) 150.

Figure 2:
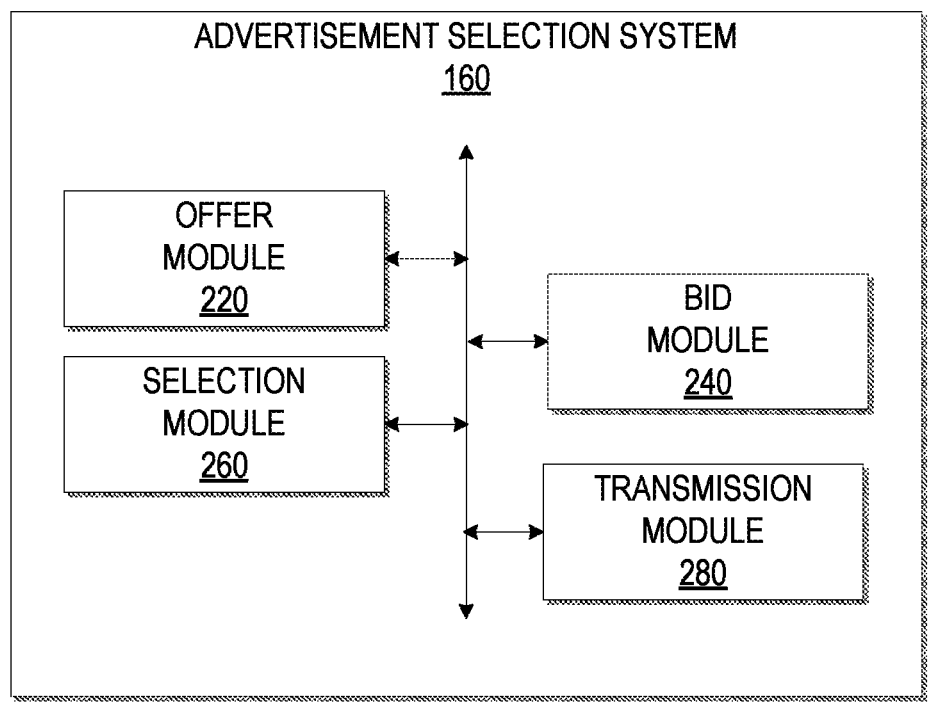
FIG. 2 is a block diagram illustrating one embodiment of a system, according to some example embodiments.

FIG. 2 is a block diagram illustrating one embodiment 200 of a system, according to some example embodiments. According to this embodiment, the advertisement selection system 160 includes an offer module 220, a bid module 240, a selection module 260, and a transmission module 280. In various embodiments, some or all of the modules 220-280 communicate with each other, for example, via a network coupling, shared memory, or the like. Each module of modules 220-280 can be implemented as a single module, combined into other modules, or further subdivided into multiple modules. Other modules not pertinent to example embodiments can also be included, but are not shown.

In one example embodiment, the offer module 220 is configured to submit an offer to display an advertisement to a user 106 to one or more advertisement servers. In one example, an application executing at a remote mobile computing device requests an advertisement from the offer module 220. In one example, the offer module 220 offers an advertising space to several different advertisement services. In another example, the offer module 220 submits the offer to an advertising network. Of course, one skilled in the art may recognize a wide variety of different ways in which advertising space may be offered to an advertising entity and this disclosure is meant to include all such ways.

In another example embodiment, the bid module 240 is configured to receive one or more advertising bids. For example, in response to the offer module 220 transmitting an offer to an advertising service, the bid module 240 receives one or more bids from the advertising service. In one example embodiment, the bids indicate an advertisement to be displayed in the advertising spot and a bid amount. The bid amount indicates an amount to be paid in response to the advertising being displayed to the user 106. In other embodiments, the bid amount is contingent upon a user 106 interacting with the advertisement or providing some input or response to the advertisement, however, this is not necessarily the case.

In one example embodiment, the selection module 260 is configured to select one of the received bids in accordance with any of the ways described herein. The selection module 260, in one example, selects a bid that results in a highest product by determining an estimated conversion rate for an advertisement indicated by a bid and multiplies that value by the bid amount for the bid. Many different examples will be described in subsequent paragraphs.

In one example, one factor in determining a conversion rate for the advertisement includes a user 106's average time between interfaces (e.g., web pages, or the like) and the selection module 260 determines that a potential viewer of the advertisement remains on a web page for less than 5 seconds, based on an average click rate for the user 106. In response to determining that an advertisement indicated by a bid will take longer to transmit than the 5 seconds, the selection module 260 does not select the bid.

In one example, one factor in determining a conversion rate for the advertisement includes physical or virtual location of an advertisement. In this example, the selection module 260 determines that an indicated advertisement is located so remotely from the device that would display the advertisement, the transmission of the advertisement would exceeds a user 106's likely time remaining on a display to view the advertisement. In one example, an indicated advertisement is located in a different country than the display device. In other example embodiments, the selection module 260 considers network topology in determining the conversion rate.

In another example embodiment, a factor in the conversion rate includes technical capabilities of a display device. In this example, the selection module 260 disqualifies a bid that indicates an advertisement that is not displayable by a display device. In one example, the advertisement indicates a display resolution of 800×600 pixels, however, the display device can only display 640×480 pixels. In this example, the selection module 260 would indicate a conversion rate of 0% because the advertisement cannot be displayed on the display device. In other examples, the selection module 260 disqualifies a bid that indicates an advertisement not displayable due to codecs, available libraries, hardware requirements, or other technical limitations.

In another example embodiment, a factor in determining a conversion rate includes a bid amount above a threshold value. In one example, a threshold bid amount is $40. In this example, in response to receiving a bid that includes a bid amount that exceeds $40, the selection module 260 may automatically set the conversion rate to 100%. Although the value 100% does not necessarily reflect a calculated value, the selection module 260 sets the conversion rate to 100% to guarantee selection of the bid with the high bid amount. In this way, the advertisement selection system 160 gambles by selecting such a bid, although the other factors may indicate a lower conversion rate. In one example, the threshold value is received from a user 106 or administrator of the advertisement selection system 160.

In one example embodiment, the selection module 260 employs a multi-variable optimization problem that considers the factors described to determine a conversion rate. Embodiments of the invention contemplate that the multi-variable optimization problem may include all factors described herein and may learn or train on previous bid selections. In this way, the selection module 260 may learn from the multi-variable optimization problem in selecting a bid that will likely yield increased profits due to an increased likelihood that the user 106 will see an advertisement.

In another example embodiment, a factor that affects the conversion rate is whether a portion of an advertisement is already stored on the device that will display the advertisement. In one example, a user 106 using the display device may have previously viewed an image of an item. In response to an advertisement including the image, the selection module 260 increases a conversion rate for the advertisement because a portion of the advertisement already exists on the display device. This decreases transfer times for the advertisement because the advertisement need only transfer missing information. In this way, an advertisement that is at least partially already on a display device may more quickly be displayed as indicated by the increased conversion rate.

In one example embodiment, the selection module 260 modifies an indicated advertisement based on a determination that a portion of the ad is stored on the computing device intending to display the advertisement. In one example, the complete ad is stored on the display device. In this example, the selection module 260 increases a conversion rate because the advertisement can be quickly displayed without transferring the ad to the display device.

In another example embodiment, the advertisement includes a video and the selection module 260 modifies a background of the video based on the geographical location of the display device. For example, based on a state where the display device is located, the selection module 260 modifies the video to include a background that includes notable landmarks located within the state. In this way, the advertisement is more customized to the geographical location.

In another example embodiment, the transmission module 280 transfers instructions for generating the advertisement. In one example, the advertisement includes two or more distinct images in specific locations and text information presented at another location. In this way, the advertisement can be represented using very little information and the advertisement is generated at the display device. In this way, the advertisement can be displayed more quickly because the transfer happens more quickly and the advertisement is generated at the display device.

In certain embodiments, the advertisement selection system 160 supports real-time selling of advertising spots and may determine and provide an advertisement in only a few seconds. In other embodiments, the advertisement selection system 160 determines a probability that the user 106 will interact with the advertisement. The system 160 may then determine an estimated profit for displaying the advertisement by multiplying the bid amount with the conversion rate.

In one example embodiment, the transmission module 280 is configured to transmit the advertisement indicated with the selected bid to the display device. The transmission module 280 may transmit the advertisement in any way one skilled in the art may appreciate. In certain examples, the transmission module 280 transmits the advertisement by requesting the advertisement be transmitted to the display device. In one example, the advertisement is stored on an ad server and the transmission module 280 commands the ad server to transmit the advertisement. In certain examples, the transmission module 280 requests the advertisement using an API, or any other interface to an advertising service.

Figure 3:
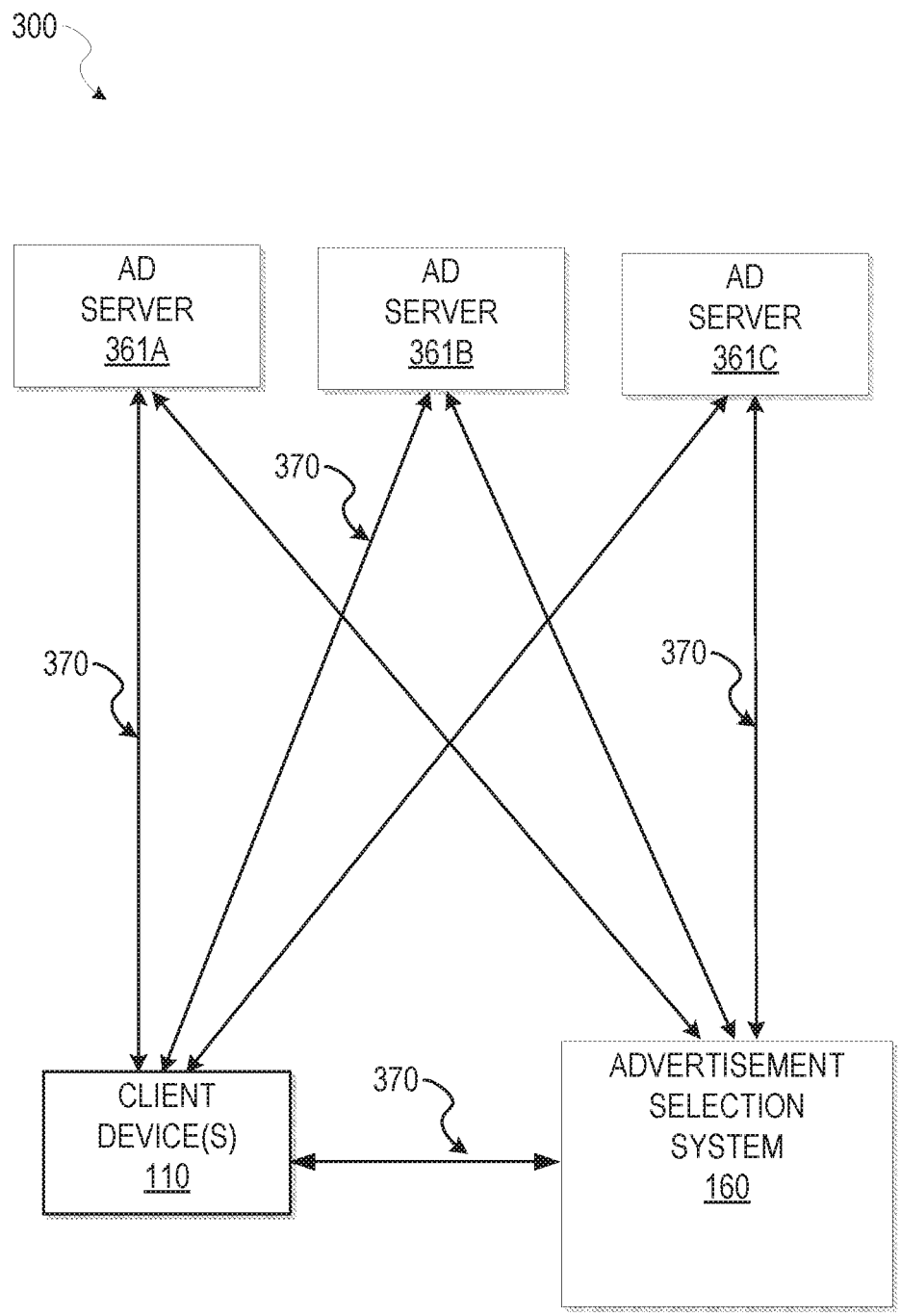
FIG. 3 is a block diagram illustrating one embodiment of a system, according to some example embodiments.

FIG. 3 is a block diagram illustrating one embodiment of a system 300, according to some example embodiments. In one embodiment, the system 300 includes the advertisement selection system 160, one or more client devices 110, and three or more advertisement (ad) servers 361.

In one example embodiment, ad server 361A offers a video that is 50 Mebibytes (MiB) in size, ad server 361B offers an image that is 500 Kibibytes (KiB) in size, and ad server 361C offers directions to construct a synthetic image. In response to executable code at a client device 110 identifying a spot for an advertisement, the advertisement selection system 160 submits an offer to display an advertisement to each of the ad servers 361.

In one example embodiment, ad server 361A transmits a bid that identifies the video and an $8 bid amount, ad server 361B transmits a bid that identifies the image and a $3 bid amount, ad server 361C transmits a bid that identifies resources to be used to generate the advertisement and a bid amount of $2.

In one example embodiment, the selection module 260 determines that the bid from ad server 361A has a conversion rate of 15%, the bid from ad server 361B has a conversion rate of 25%, and the bid from ad server 361C has a conversion rate of 30%.

In another example embodiment, the selection module 260 calculates a product by multiplying the conversion rate and the bid amount for each bid. In this example embodiment, the product represents an estimated profit. Accordingly, the video from ad server 361A has an estimated profit of $1.20, the image from ad server 361B has an estimated profit of $0.75, and the synthetic directions from ad server 361C has an estimated profit of $0.60. In this example, the selection module 260 selects the video from ad server 361A because it offers the highest estimated profit.

In other embodiments, the ad servers 361, the client device(s) 110, and the advertisement selection system 160 communicate in any way described herein, or as one skilled in the art may appreciate. Certain examples include a wireless network, a wired network, or any other communication medium.

In some example embodiments, the client device(s) 110 include available graphical elements at the client device(s) 110 that may be used to generate and/or modify an advertisement. Furthermore, the client device(s) 110 may also transmit technical limitations. In one example embodiment, the selection module 260 considers the available graphical elements and/or the technical limitations of the client device(es) 110 to select an advertisement as described herein.

In another example embodiment, the advertisement selection system 160 tracks accuracy of advertisement servers 361. In one example, the ad server 361A reports that the video advertisement is 10 MiB in size. In response to the video actually being 15 MiB in size, the selection module 260 may flag the ad server 361A as an incorrect advertisement identifier. In response to the ad server 361A submitting a bid for a subsequent advertising spot, the selection module 260 may immediately remove the bid without consideration.

In this way, the advertisement selection system 160 ensures quality bids in the advertisement chain.

Figure 4:
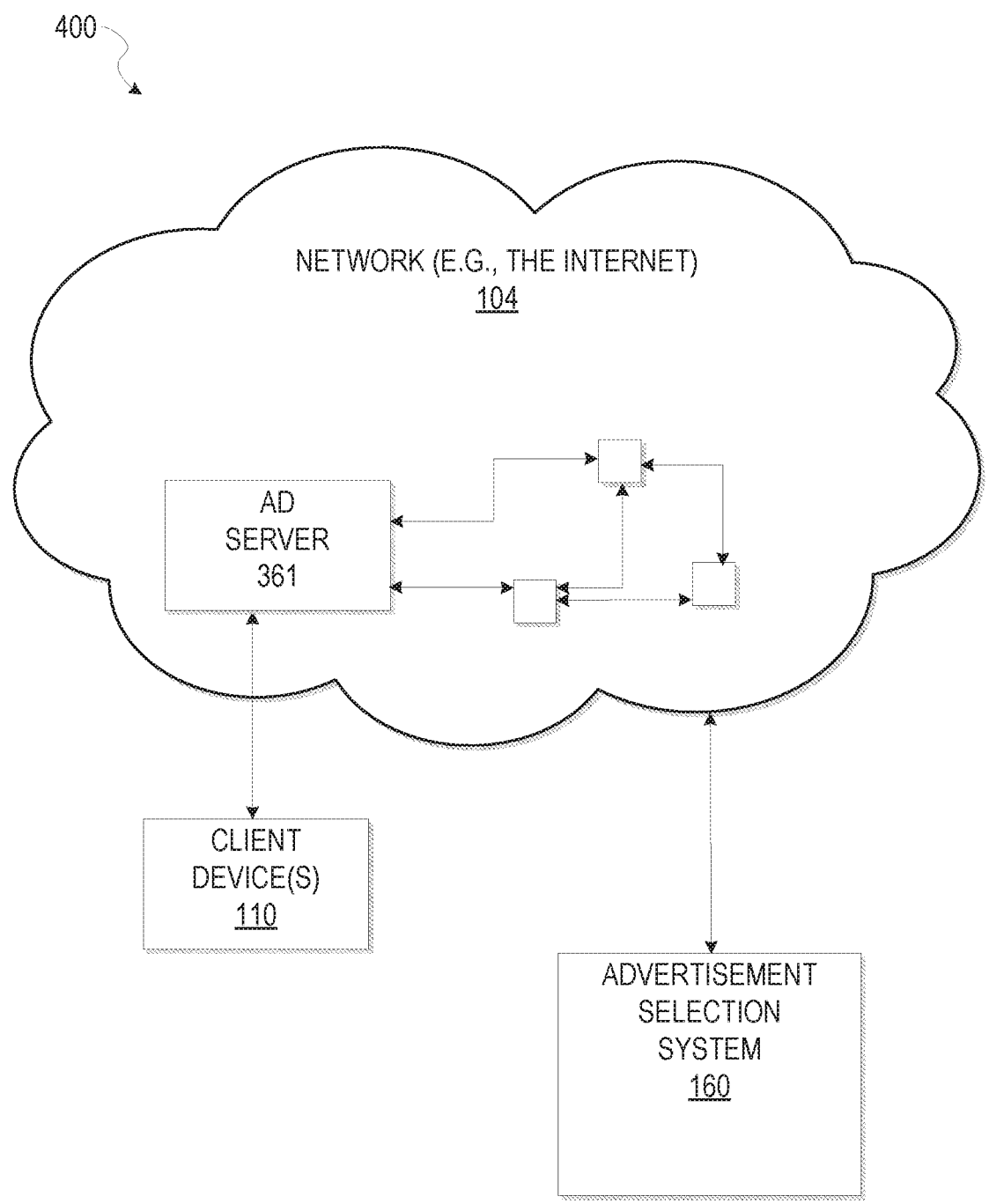
FIG. 4 is a block diagram illustrating an example system for selecting advertisements, according to some example embodiments.

FIG. 4 is a block diagram illustrating an example system 400 for selecting advertisements, according to some example embodiments. In this embodiment, the system 400 includes an ad server 361, a client device 110, and the advertisement selection system 160.

In this example embodiment, the network 104 includes many ad servers 361, network devices, and the like. However, in one example, the ad server 361 is physically located closer to the client device(s) 110 than other ad servers in the network 104. In this example, the selection module 260 increases the conversion rate for a bid from the ad server 361 because an advertisement from the ad server 361 will more quickly be displayed to a user 106 of the client device(s) 110.

In another example embodiment, a distance between the ad server 361 and the client device(s) 110 is a virtual distance. For example, the virtual distance may be measured in a number of network devices, a number of packet forwards, network hops, or the like. In this way, the selection module 260 may increase a conversion rate for an advertisement that may be more quickly transferred to the client device(s) 110, regardless of physical distance. Thus, the selection module 260 considers network topology in determining a conversion rate for an advertisement.

In another example embodiment, the selection module 260 considers technical limitations of a network path between the ad server 361 and a client device(s) 110. For example, in response to the network connection between the ad server 361 and the client device(s) 110 being a wireless connection, the selection module 260 decreases a conversion rate for an advertisement transmitted from the ad server. In another example, in response to the network connection between the ad server 361 and the client device(s) 110 being a high-speed wired connection, the selection module 260 increases a conversion rate for the advertisement because the advertisement will likely be more quickly transmitted to the client device(s) 110 requesting the advertisement.

Figure 5:
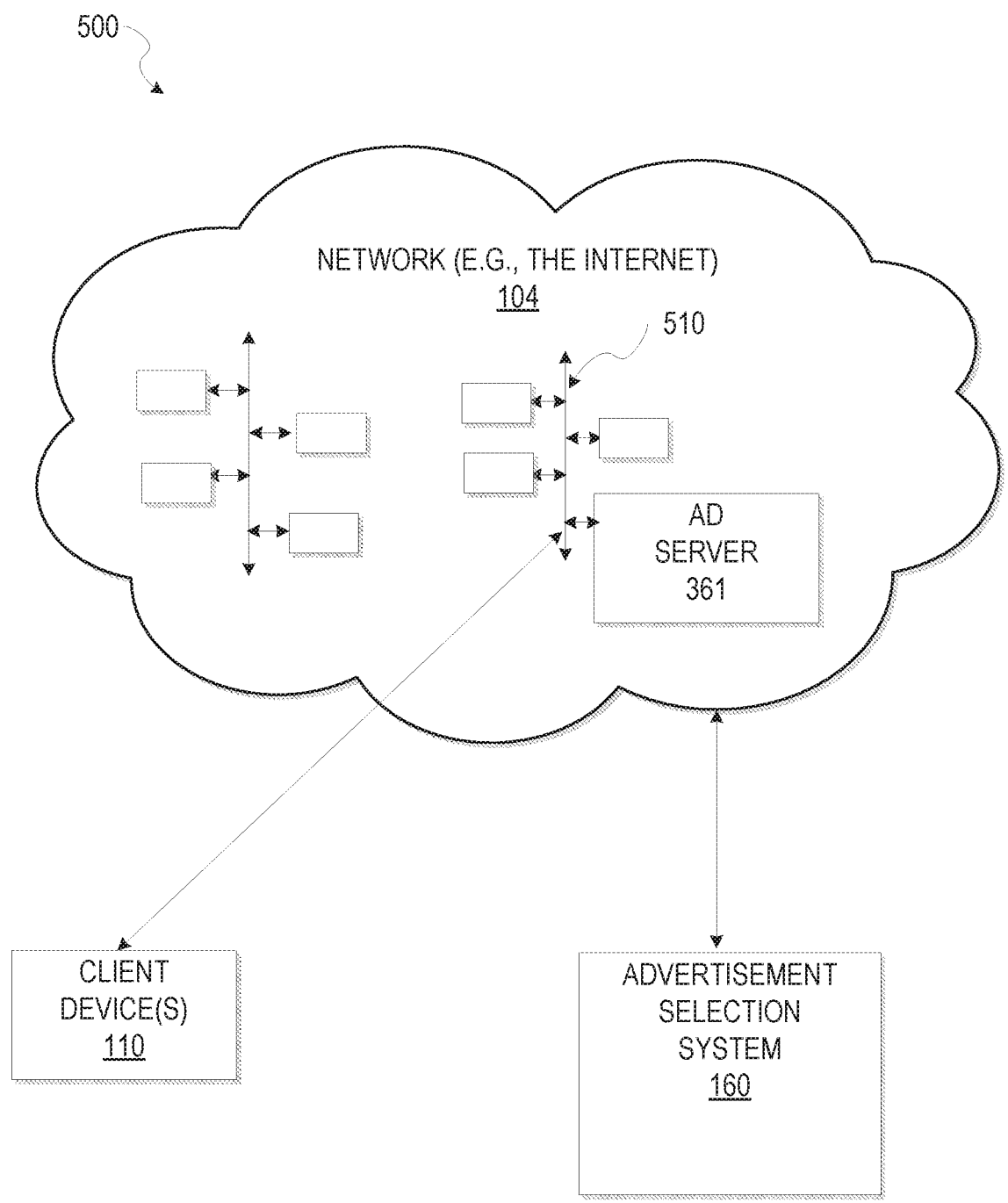
FIG. 5 is a block diagram illustrating another example system for selecting advertisements, according to some example embodiments.

FIG. 5 is a block diagram illustrating another example system 500 for selecting advertisements, according to some example embodiments. In one example, the system 500 includes a network 104, an ad server 361, the advertisement selection system 160, and a client device(s) 110.

In one example embodiment, the client device(s) 110 communicates on the network 104 via the network 510. In response to the client device(s) 110 indicating an available advertising spot, the advertisement selection system 160 submits an offer, and receives bids. The selection module 260, in this example embodiment, increases a conversion rate for a bid submitted from the ad server 361 because the ad server 361 and the client device(s) 110 requesting the advertisement communicate on a same network 510.

As one skilled in the art may appreciate, when devices communicate on a same network 104, data may be more quickly transferred between the devices. Therefore, the selection module 260 increases a likelihood that the advertisement from the ad server 361 will be selected because an advertisement transferred between the ad server 361 and the client device(s) 110 will be transmitted more quickly.

Figure 6:
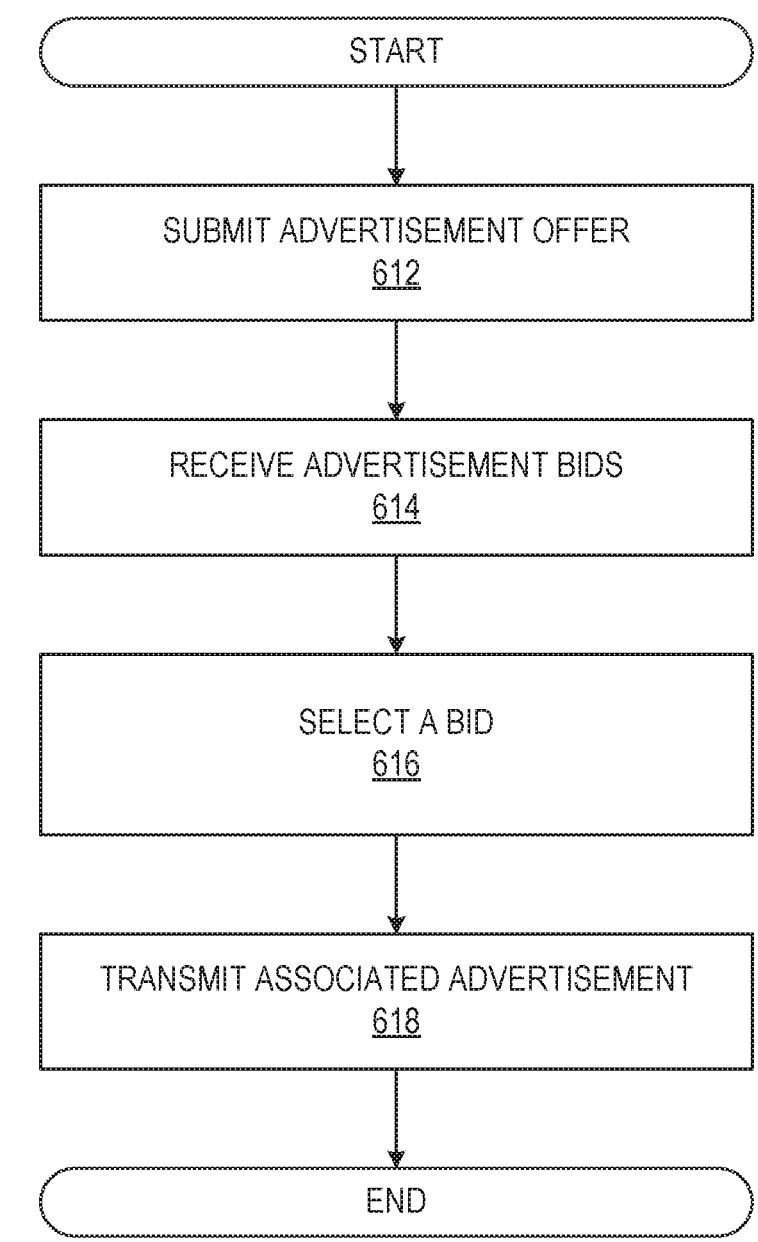
FIG. 6 is a flow diagram illustrating an example method for selecting advertisements, according to some example embodiments.

FIG. 6 is a flow diagram illustrating an example method 600 for selecting advertisements, according to some example embodiments. Operations in the method 600 may be performed by any of the modules described in FIG. 2. Operations in the method 600, according to one example embodiment, include operations 612, 614, 616, and 618.

In one embodiment, the method 600 begins and, at operation 612, the offer module 220 submits an offer to display an advertisement to a user 106. The offer may be submitted in response to receiving an indication from a client device(s) 110 that an advertising spot is available. In one example, an application operating at the client device 110 requests an advertisement to be displayed and forwards the available advertising spot to the offer module 220.

The method 600 continues at operation 614 and the bid module 240 receives one or more advertising bids. In one example embodiments, the bids indicate an advertisement and a bid amount. In one example, the bid indicates an advertisement stored on a remote server (e.g., an advertising server), and indicates a bid amount of $5.

The method 600 continues at operation 616 and the selection module 260 selects a bid from the received advertising bids that results in a highest product. In one example embodiment, the highest product is calculated by multiplying a conversion rate by the hid amount. In this way, advertisements that are less likely to be actually displayed at the client device(s) 100 will have a lower estimated profit although the bid amounts may be higher. Furthermore, advertisement with a very high conversion rate (e.g., a likelihood of being displayed to the user 106), may yield a higher estimated profit because, in a given number of situations, the advertisement will more likely be displayed, and, over time, result in increased profits. In this example, this is the case although the bid amount for the advertisement may be less than other bid amounts for other advertisements.

The method 600 continues at operation 618 and the transmission module 280 transmits the advertisement corresponding to the selected bid to the client device(s) 110.

Figure 7:
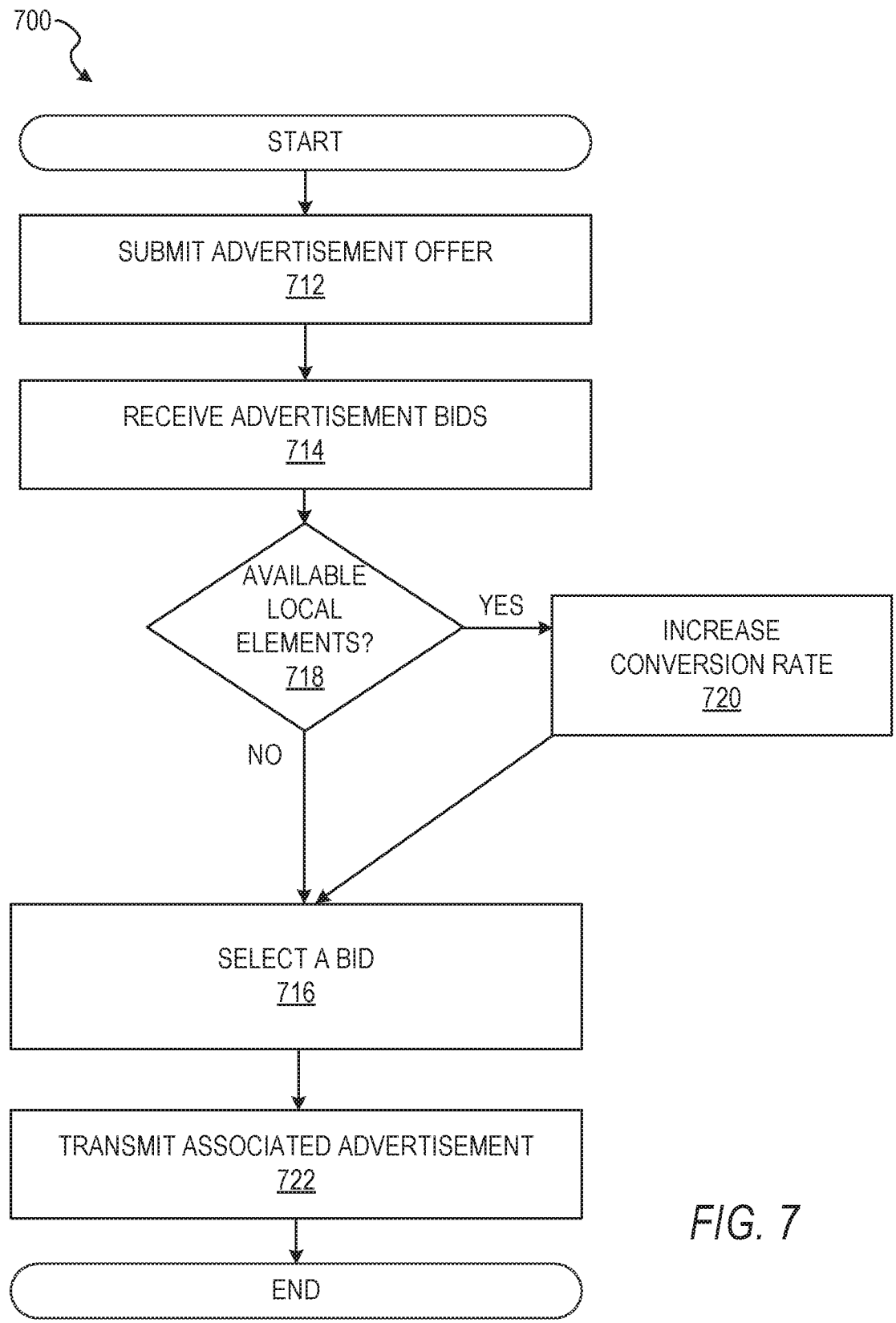
FIG. 7 is a flow diagram illustrating another example method for selecting advertisements, according to some example embodiments.

FIG. 7 is a flow diagram illustrating another example method 700 for selecting advertisements, according to some example embodiments. The operations of the method 700 may be performed by any module shown in FIG. 2.

In one embodiment, the method 700 begins and at operation 712, the offer module 220 submits an offer to display an advertisement to a user 106. The method 700 continues at operation 714 and the bid module 240 receives one or more advertising bids. The method 700 continues at operation 718 and the selection module 260 determines whether one or more graphical elements that are local to the client device(s) 110 may be used to generate the advertisement.

In response to local elements being available to be included in the advertisement, the selection module 260 increases a conversion rate for the bid at operation 720. The method continues at operation 716. In response to there not being any local graphical elements available for use with the advertisement, the method 700 continues at operation 716.

In another example embodiment, the selection module 260 adjusts the conversion rate based on a percentage of local elements that constitute the advertisement. In one example, the advertisement includes one local graphical element and the selection module 260 increases the conversion rate for the advertisement by 5%. In another example, the selection module 260 determines that 80% of the advertisement may be generated using local graphical interface elements, and the selection module 260 increases the conversion rate for the advertisement by 80%. In this way, the selection module 260 adjusts the conversion rate for an advertisement based on an amount of local graphical elements that may be included in the advertisement. In this way, advertisements that may more quickly be generated will more likely be selected by the selection module 260.

The method 700 continues at operation 716 and the selection module 260 selects a bid from the received advertising bids that results in a highest product based, at least in part, on selection of the highest estimated profit calculated by multiplying the conversion rate for an ad by the bid amount.

The method 700 continues at operation 722 and the transmission module 280 transmits the advertisement corresponding to the selected bid to the client device(s) 110. In one example embodiment, the transmission module 280 instructs the client device 110 to download the advertisement from an ad server 361. In one embodiment, where the advertisement is generated using local graphical elements, the transmission module 280 transmits instructions for generating the advertisement using the local elements.

Figure 8:
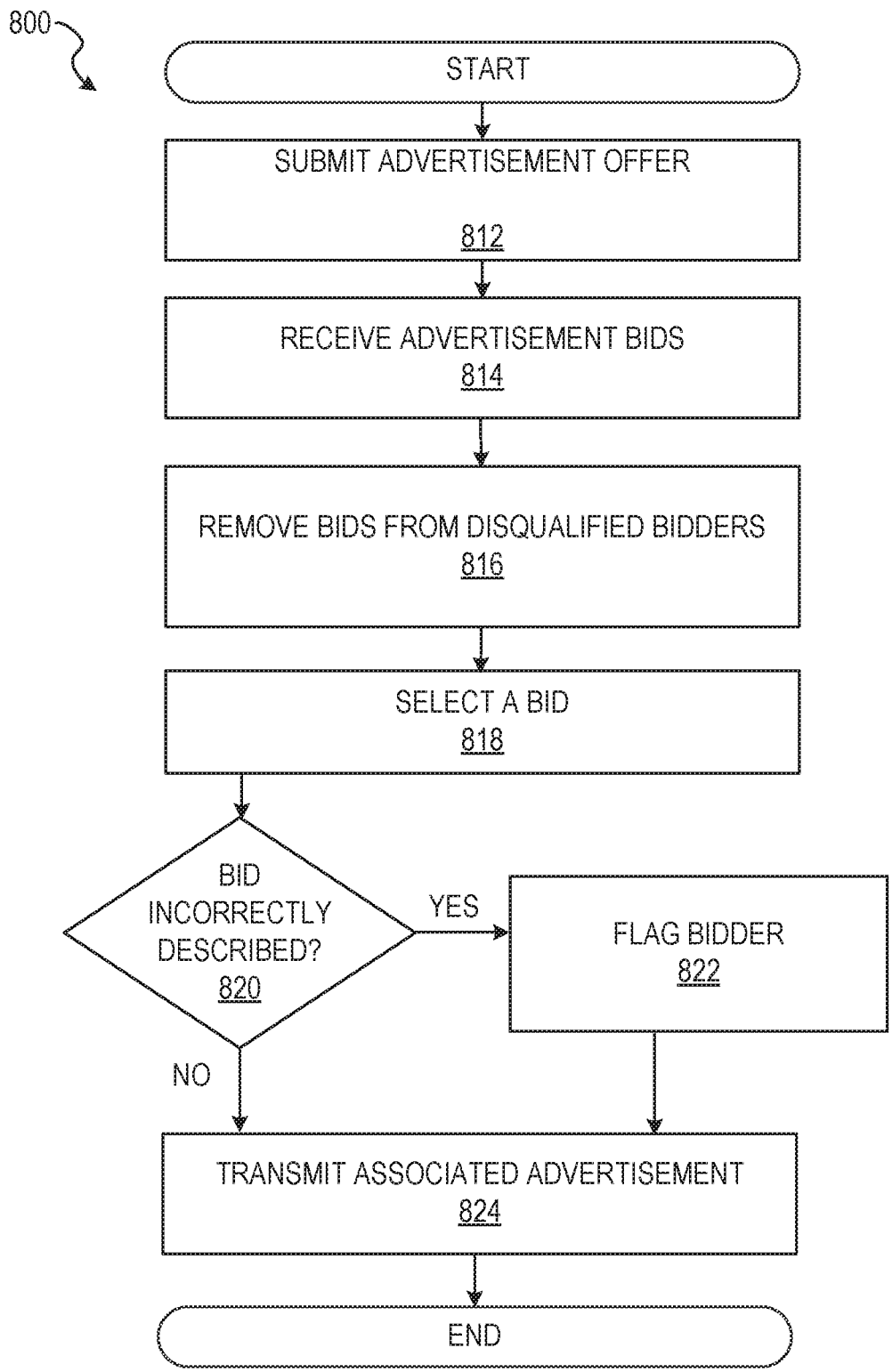
FIG. 8 is a flow diagram illustrating an example method for selecting advertisements, according to another example embodiment.

FIG. 8 is a flow diagram illustrating an example method for selecting advertisements, according to another example embodiment. Operations in the method 800 may be performed by any of the modules described in FIG. 2. Operations in the method 800, according to one example embodiment, include operations 812, 814, 816, 818, 820, 822, and 824.

In one embodiment, the method 800 begins, and at operation 812, the offer module 220 submits an offer to display an advertisement to a user 106 in response to receiving an indication from a client device(s) 110 that an advertising spot is available. The method 800 continues at operation 814 and the bid module 240 receives one or more advertising bids.

The method 800 continues at operation 816 and the selection module 260 disqualifies one or more bids received from bidders that have submitted incorrect bids in the past. In one example, the bidder submits a bid that incorrectly identifies a size of the advertisement. In another example, the bidder submitted a bid that includes a video, but indicated that the advertisement was an image.

The method 800 continues at operation 818 and the selection module 260 selects a bid from the remaining advertising bids that results in a highest product calculated by multiplying a conversion rate by the bid amount. The method 800 continues at operation 820 and the selection module 260 determines whether the advertisement indicated by the bid is accurately described. In one example, the selection module 260 downloads the advertisement and determines the size, format, type, etc.

In response to the bid not correctly describing the indicated advertisement, the method 800 continues at operation 822 and the selection module 260 flags the bidder, thereby disqualifying the bidder from submitting bids for further advertising spots. The method continues at operation 824. In response to the indicated advertisement being correctly described by the bid, the method 800 continues at operation 824. At operation 824, the transmission module 280 causes transmission of the selected advertisement to the client device(s) 110.

Figure 9:
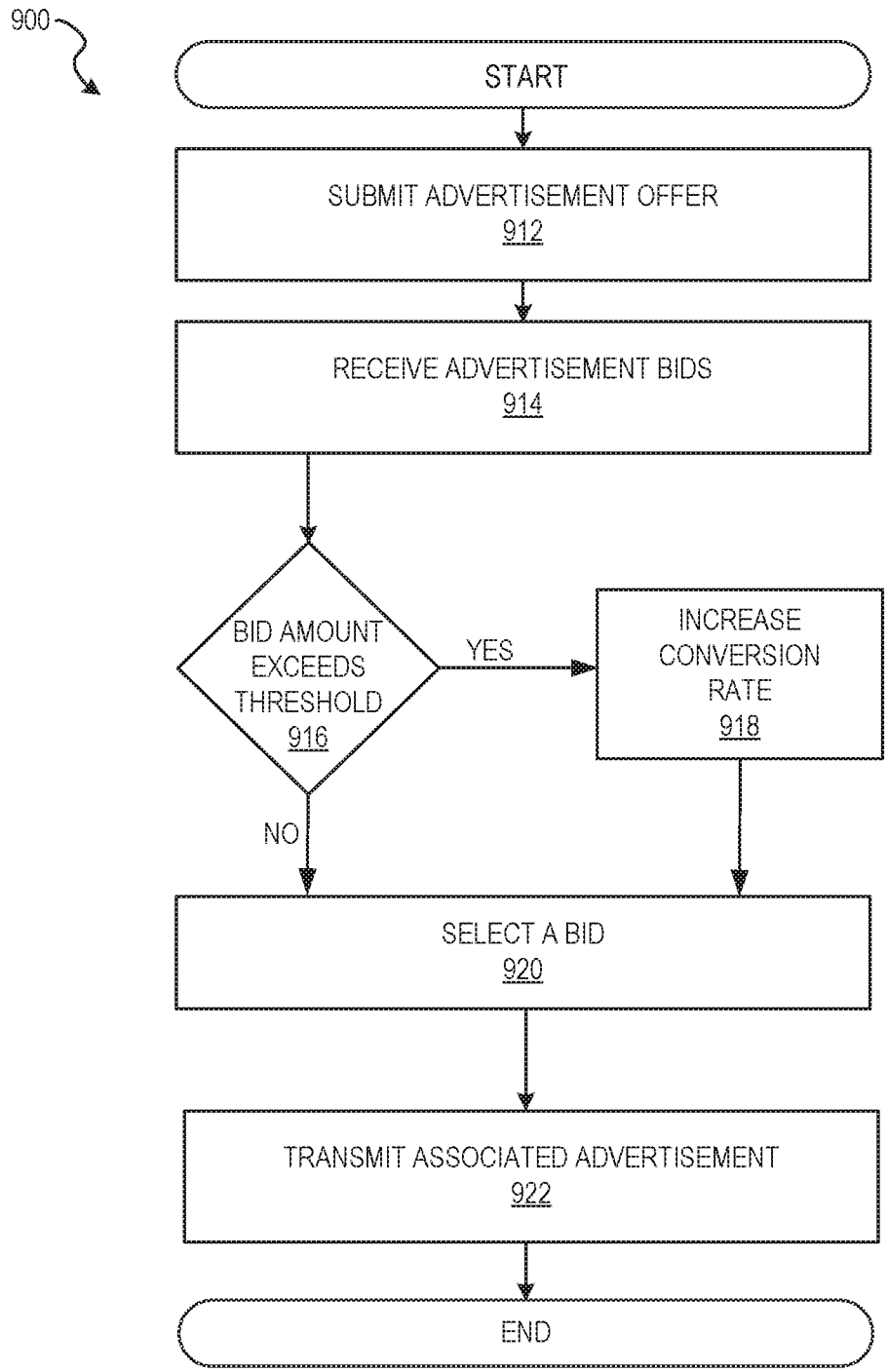
FIG. 9 is a flow diagram illustrating one example embodiment of a method for selecting advertisements.

FIG. 9 is a flow diagram illustrating one example embodiment of a method 900 for selecting advertisements. Operations in the method 900 may be performed by any of the modules described in FIG. 2. Operations in the method 900, according to one example embodiment, include operations 912, 914, 916, 918, 920, and 922.

In one embodiment, the method 900 begins and at operation 912, the offer module 220 submits an offer to display an advertisement to a user 106 in any way described herein. The method 900 continues at operation 914 and the bid module 240 receives one or more advertising bids in any way described herein.

The method 900 continues at operation 916 and the selection module 260 determines whether one or more of the bids include a bid amount that is above a threshold value. In one example, a threshold bid amount is $25. In response to a bid amount exceeding the threshold amount, the method 900 continues at operation 918 and the selection module 260 increases a conversion rate for the bid. In one example, the selection module 260 increases the conversion rate to 100% regardless of other factors. In other embodiments, the selection module 260 increases conversion rates for all bids that exceed the threshold bid amount. The method continues at operation 920. In response to a bid amount not exceeding the threshold bid amount, the method 900 continues at operation 920.

At operation 920, the selection module 260 selects a bid from the received advertising bids that results in a highest product. In one example, where multiple bids exceeded the threshold bid amount, the selection module 260 selects the advertisement with the highest bid amount as the bid with the highest product. The method 900 continues at operation 922 and the transmission module 280 causes transmission of the selected advertisement to the client device(s) 110.

Figure 10:
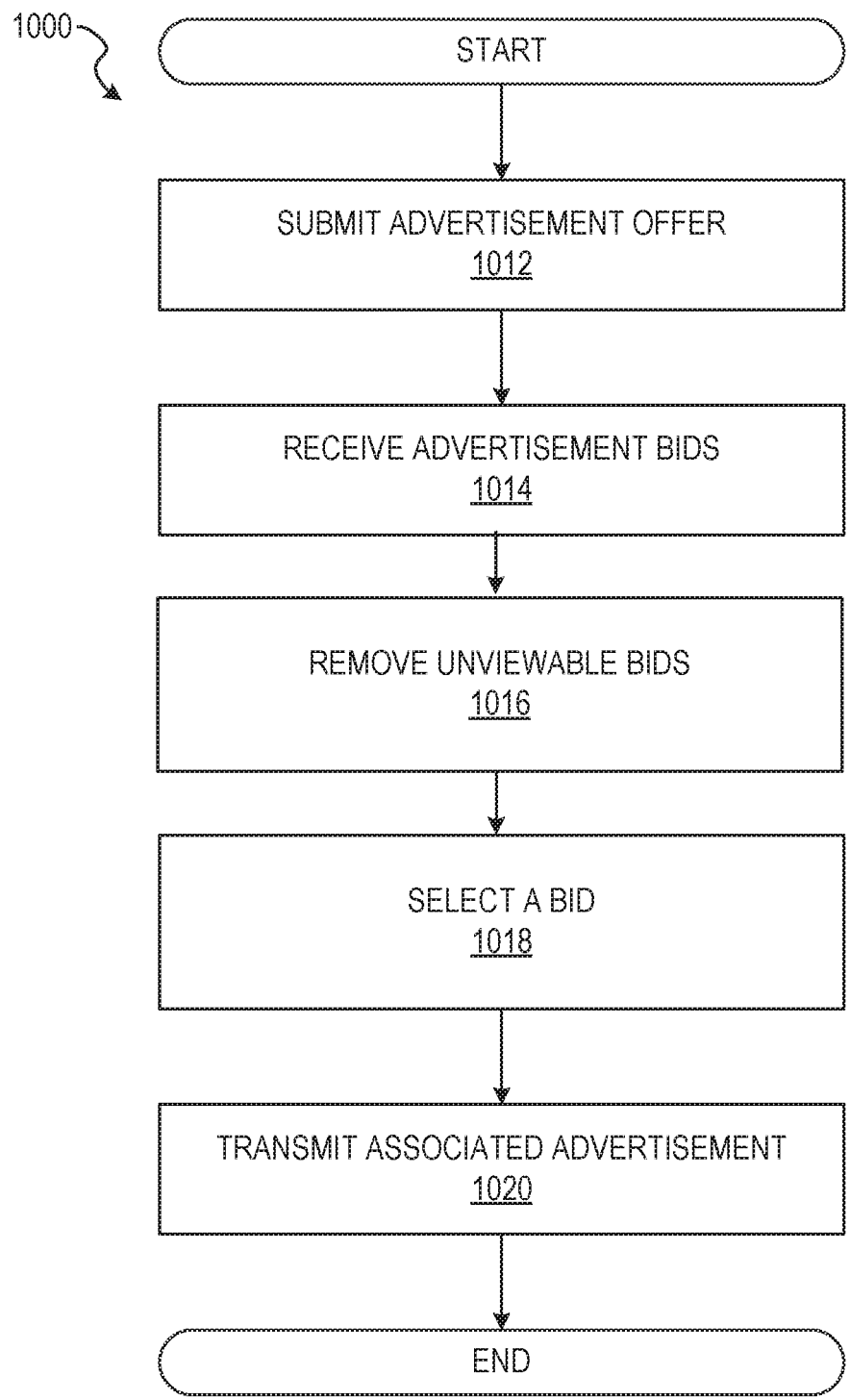
FIG. 10 is a flow diagram illustrating another example method for selecting advertisements, according to some example embodiments.

FIG. 10 is a flow diagram illustrating another example method 1000 for selecting advertisements, according to some example embodiments. Operations in the method 1000 may be performed by any of the modules described in FIG. 2. Operations in the method 1000, according to one example embodiment, include operations 1012, 1014, 1016, 1018, and 1020.

In one embodiment, the method 1000 begins and, at operation 1012, the offer module 220 submits an offer to display an advertisement to a user 106. The method 1000 continues at operation 1014 and the bid module 240 receives one or more advertising bids. In this example embodiment, the respective bids include technical requirements for displaying the advertisement. In certain examples, technical requirements include display resolution, color depth, processing capabilities, codecs, libraries, other executable code needed to display the ad, or the like.

The method 1000 continues at operation 1016 and the selection module 260 removes unviewable bids from consideration. In one example, the client device(s) 110 that intends to display the ad is limited to a 16-bit color depth. In response to the advertisement exceeding the 16-bit color depth, the selection module 260 removes the ad from consideration. In another example, the ad includes a video encoded according to a certain codec or library. In response to the client device 110 not having the required library, the selection module 260 removes the bid from consideration because the client device(s) 110 cannot display the advertisement. Of course, one skilled in the art may recognize other ways in which a client device(s) 110 may not be able to display an advertisement and this disclosure is meant to include all such ways and/or limitations. The method 1000 continues at operation 1018.

At operation 1018 and the selection module 260 selects a bid from the remaining advertising bids that results in a highest product. The method 1000 continues at operation 1020 and the transmission module 280 transmits the advertisement corresponding to the selected hid to the client device(s) 110.

Modules, Components, And Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Software Architecture

Figure 11:
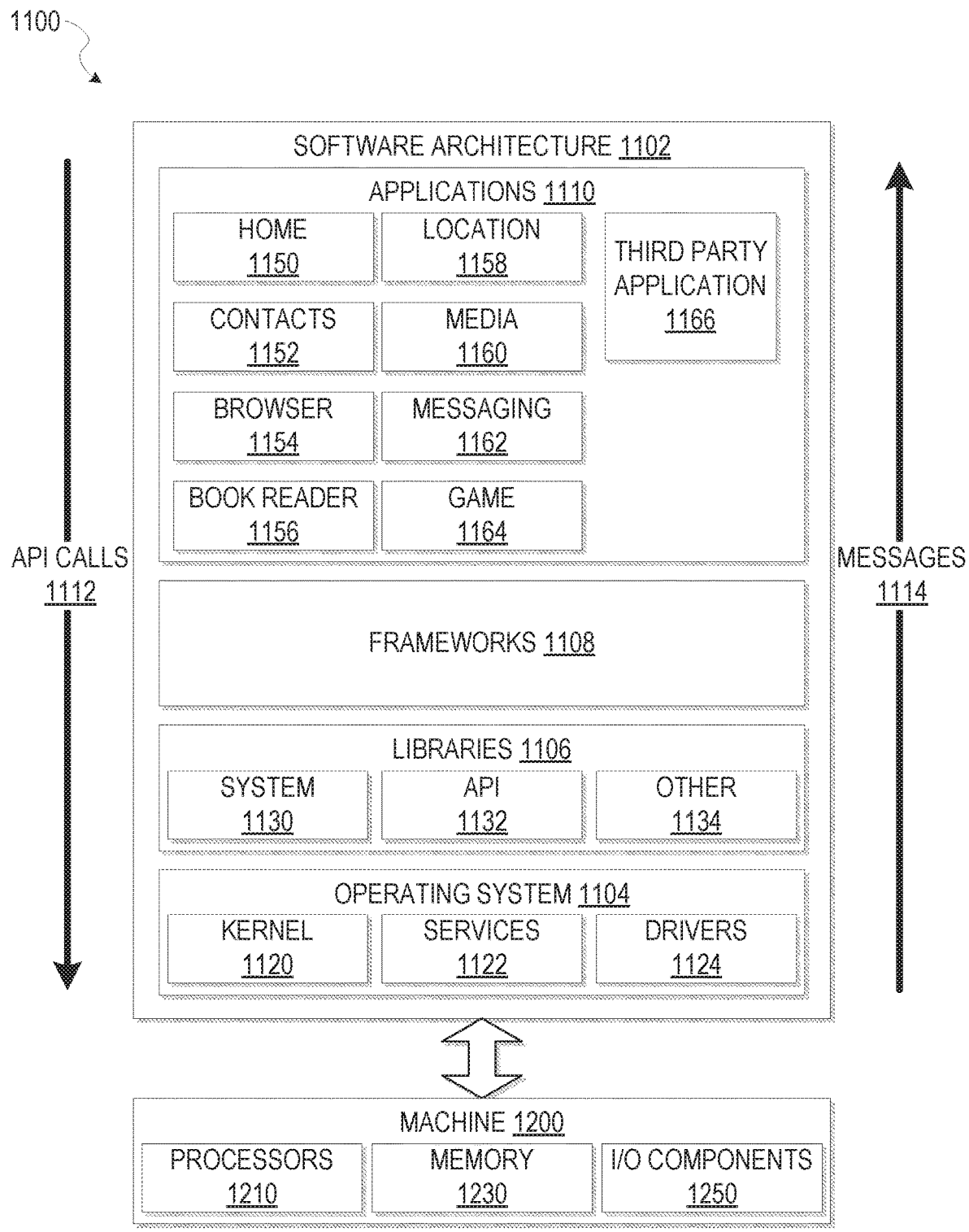
FIG. 11 is a block diagram illustrating an example of a software architecture that may be installed on a machine, according to some example embodiments.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as machine 1200 of FIG. 12 that includes processors 1210, memory 1230, and input/output (I/O) components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments. In one example, the advertisement selection system 160 operates as an application 1110.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems, in this example, the third party application 1166 can invoke the API calls 1112 provided by the operating system 1104 to facilitate functionality described herein.

Example Machine Architecture and
Machine-Readable Medium

Figure 12:
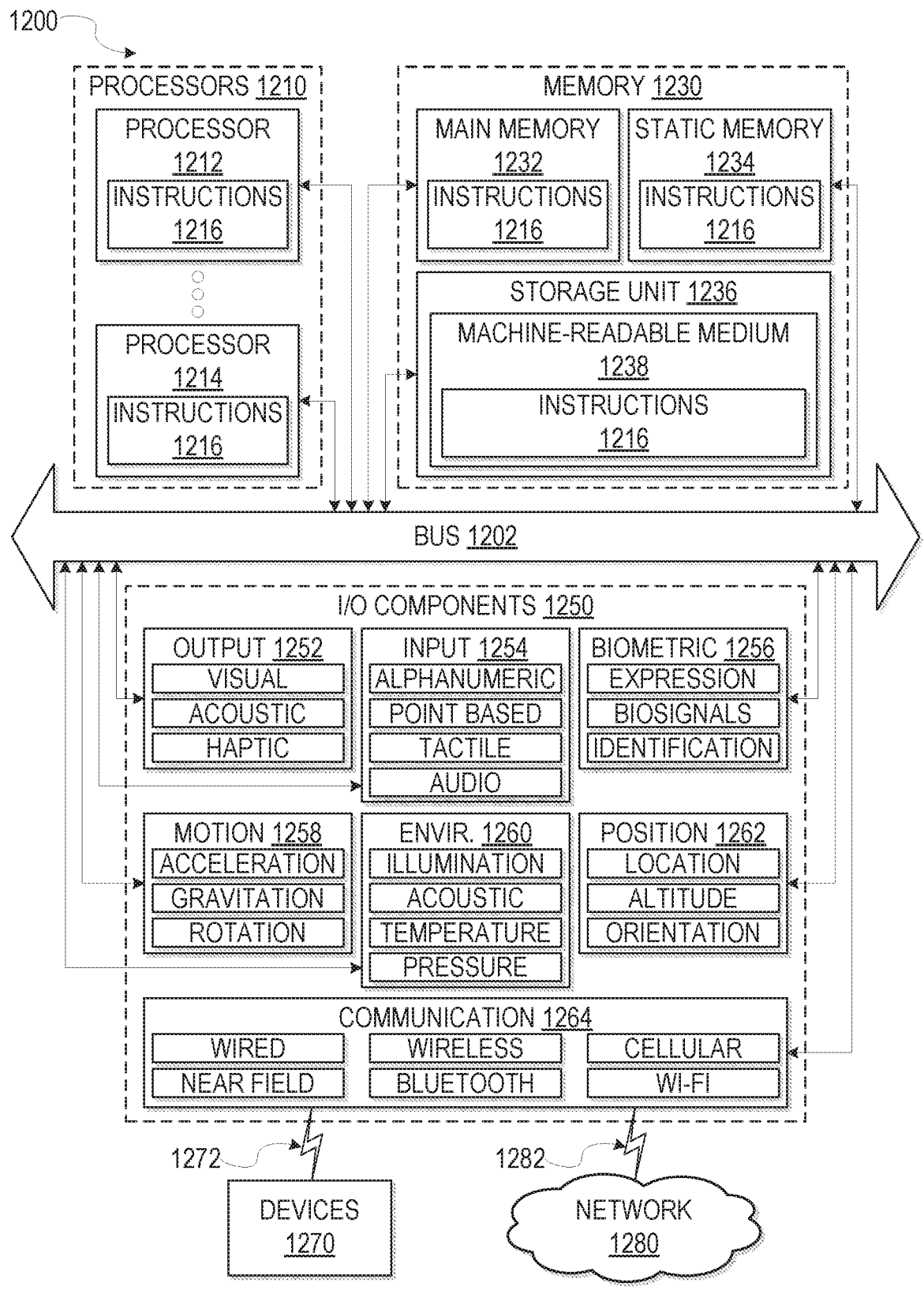
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application 1110, an apples, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein. In one specific example, the various modules 220, 240, 260, 280 are included in the instructions 1216.

In various embodiments, the machine 1200 comprises processors 1210, memory 1230, and I/O components 1250, which can be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1212 and a processor 1214 that may execute the instructions 1216. The term "processor" is intended to include multi-core processors that may comprise two or more independent processors (also referred to as "cores") that can execute instructions 1216 contemporaneously. Although FIG. 12 shows multiple processors 1210, the machine 1200 may include a single processor 1212 with a single core, a single processor 1212 with multiple cores (e.g., a multi-core processor), multiple processors 1210 with a single core, multiple processors 1210 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor 1212's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (UPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium should be considered as being transportable from one physical location to another. Additionally, since the machine-readable medium 1238 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   submitting, to one or more advertisement servers, an offer to display an advertisement at a computing device;
   receiving a plurality of advertising bids from the one or more advertisement servers, the plurality of advertising bids indicating corresponding advertisements and comprising corresponding bid amounts;
   determining that a given advertising bid of the plurality of advertising bids has been received from a bidder that has previously submitted an incorrect advertising bid;
   disqualifying the given advertising bid from the plurality of advertising bids resulting in a remaining set of advertising bids of the plurality of advertising bids;
   determining that at least a portion of a graphical element associated with one or more of the advertising bids is stored on a computing device;
   selecting a given advertising bid from the remaining set of advertising bids based on a factor, associated with each advertising bid, that is computed as a function the corresponding bid amount of the respective advertising bid, the factor being further computed based on a conversion rate adjusted based on the portion of the graphical element associated being stored on the computing device; and
   causing the advertisement corresponding to the selected given advertising bid to be displayed on the computing device.

2. The method of claim 1, further comprising:
   computing conversion rates for the advertisements corresponding to the plurality of advertising bids.

3. The method of claim 2, further comprising computing the conversion rates based on an advertisement size, network characteristics of a network used by the computing device, and a topology of the network used by the computing device.

4. The method of claim 2, wherein the given advertising bid that is selected corresponds to the first advertisement, further comprising transmitting instructions to the computing device for generating the first advertisement using at least the portion of the graphical elements that are stored on the computing device.

5. The method of claim 2, further comprising:
   identifying a first portion of the advertisement corresponding to the selected given advertising bid that is stored on the computing device; and
   transmitting, to the computing device, a second portion of the advertisement that excludes the identified first portion.

6. The method of claim 2, wherein the conversion rates of the advertisements are adjusted based on respective amounts of graphical elements, stored on the computing device, that are used to generate the respective advertisements.

7. The method of claim 6, further comprising:
   determining a first amount of graphical elements, stored on the computing device, that are used to generate the first advertisement, wherein the first advertisement corresponds to a first advertising bid of the plurality of advertising bids;
   adjusting the conversion rate computed for the first advertisement by a first value based on the determined first amount;
   determining a second amount of graphical elements, stored on the computing device, that are used to generate a second advertisement of the advertisements, wherein the second advertisement corresponds to a second advertising bid of the plurality of advertising bids, wherein the second amount is greater than the first amount; and
   adjusting the conversion rate computed for the second advertisement by a second value based on the determined second amount, wherein the second value is greater than the first value.

8. The method of claim 1, wherein the factor comprises technical capabilities of the computing device, and wherein a conversion rate that is computed for the advertisements is adjusted in response to determining that the computing device lacks capability to display a given advertisement.

9. The method of claim 1, wherein the incorrect advertisement bid incorrectly identified a size of the advertisement.

10. The method of claim 1, wherein the incorrect advertisement bid includes a video for an advertisement that was an image.

11. A system comprising:
   hardware processing circuitry;
   a hardware memory storing instructions that when executed configure the hardware processing circuitry to perform operations comprising:
   submitting, to one or more advertisement servers, an offer to display an advertisement at a computing device;

receiving a plurality of advertising bids from the one or more advertisement servers, the plurality of advertising bids indicating corresponding advertisements and comprising corresponding bid amounts;

determining that a given advertising bid of the plurality of advertising bids has been received from a bidder that has previously submitted an incorrect advertising bid;

disqualifying the given advertising bid from the plurality of advertising bids resulting in a remaining set of advertising bids of the plurality of advertising bids;

determining that at least a portion of a graphical element associated with one or more of the advertising bids is stored on a computing device;

selecting a given advertising bid from the remaining set of advertising bids based on a factor, associated with each advertising bid, that is computed as a function the corresponding bid amount of the respective advertising bid, the factor being further computed based on a conversion rate adjusted based on the portion of the graphical element associated being stored on the computing device; and causing the advertisement corresponding to the selected given advertising bid to be displayed on the computing device.

12. The system of claim 11, wherein the operations further comprise:
computing conversion rates for the advertisements corresponding to the plurality of advertising bids.

13. The system of claim 12, wherein the operations further comprise computing the conversion rates based on a advertisement size, network characteristics of a network used by the computing device, and a topology of the network used by the computing device.

14. The system of claim 12, wherein the given advertising bid that is selected corresponds to the first advertisement, and wherein the operations further comprise transmitting instructions to the computing device for generating the first advertisement using at least the portion of the graphical elements that are stored on the computing device.

15. The system of claim 12, wherein the operations further comprise:
identifying a first portion of the advertisement corresponding to the selected given advertising bid that is stored on the computing device; and
transmitting, to the computing device, a second portion of the advertisement that excludes the identified first portion.

16. The system of claim 12, wherein the conversion rates of the advertisements are adjusted based on respective amounts of graphical elements, stored on the computing device, that are used to generate the respective advertisements.

17. The system of claim 16, wherein the operations further comprise:
determining a first amount of graphical elements, stored on the computing device, that are used to generate the first advertisement, wherein the first advertisement corresponds to a first advertising bid of the plurality of advertising bids;
adjusting the conversion rate computed for the first advertisement by a first value based on the determined first amount;
determining a second amount of graphical elements, stored on the computing device, that are used to generate a second advertisement of the advertisements, wherein the second advertisement corresponds to a second advertising bid of the plurality of advertising bids, wherein the second amount is greater than the first amount; and
adjusting the conversion rate computed for the second advertisement by a second value based on the determined second amount, wherein the second value is greater than the first value.

18. The system of claim 11, wherein the factor comprises technical capabilities of the computing device.

19. The system of claim 18, wherein the conversion rate that is computed for the advertisements is adjusted in response to determining that the computing device lacks capability to display a given advertisement.

20. A non-transitory machine-readable medium storing instructions that, when executed by at least one processor of a machine, cause the machine to perform operations comprising:
submitting, to one or more advertisement servers, an offer to display an advertisement at a computing device;
receiving a plurality of advertising bids from the one or more advertisement servers, the plurality of advertising bids indicating corresponding advertisements and comprising corresponding bid amounts;
determining that a given advertising bid of the plurality of advertising bids has been received from a bidder that has previously submitted an incorrect advertising bid;
disqualifying the given advertising bid from the plurality of advertising bids resulting in a remaining set of advertising bids of the plurality of advertising bids;
determining that at least a portion of a graphical element associated with one or more of the advertising bids is stored on a computing device;
selecting a given advertising bid from the remaining set of advertising bids based on a factor, associated with each advertising bid, that is computed as a function the corresponding bid amount of the respective advertising bid, the factor being further computed based on a conversion rate adjusted based on the portion of the graphical element associated being stored on the computing device; and
causing the advertisement corresponding to the selected given advertising bid to be displayed on the computing device.

* * * * *